US009159245B2

(12) United States Patent
Smith et al.

(10) Patent No.: US 9,159,245 B2
(45) Date of Patent: Oct. 13, 2015

(54) EQUESTRIAN PERFORMANCE SENSING SYSTEM

(75) Inventors: Fraser M. Smith, Salt Lake City, UT (US); Marc X. Olivier, Salt Lake City, UT (US)

(73) Assignee: Sarcos LC, Salt Lake City, UT (US)

( * ) Notice: Subject to any disclaimer, the term of this patent is extended or adjusted under 35 U.S.C. 154(b) by 108 days.

(21) Appl. No.: 13/453,908

(22) Filed: Apr. 23, 2012

(65) Prior Publication Data
US 2013/0280683 A1    Oct. 24, 2013

(51) Int. Cl.
*G09B 9/00* (2006.01)
*A63B 69/00* (2006.01)
*G09B 19/00* (2006.01)

(52) U.S. Cl.
CPC .................................. *G09B 19/0038* (2013.01)

(58) Field of Classification Search
CPC ......... A63K 3/00; A63K 3/0046; A61B 5/114
USPC .......................................................... 434/247
See application file for complete search history.

(56) References Cited

U.S. PATENT DOCUMENTS

| | | | | | |
|---|---|---|---|---|---|
| 4,774,679 | A | * | 9/1988 | Carlin | 702/41 |
| 4,935,887 | A | * | 6/1990 | Abdalah et al. | 703/6 |
| 5,369,601 | A | * | 11/1994 | Tannenbaum | 702/139 |
| 6,612,266 | B2 | * | 9/2003 | Brooks | 119/857 |
| 7,192,387 | B2 | * | 3/2007 | Mendel | 482/8 |
| 7,467,603 | B2 | * | 12/2008 | Davies | 119/712 |
| 2003/0059753 | A1 | * | 3/2003 | Mack | 434/247 |
| 2004/0110116 | A1 | * | 6/2004 | Pretty et al. | 434/247 |
| 2007/0146484 | A1 | * | 6/2007 | Horton et al. | 348/159 |
| 2007/0287139 | A1 | * | 12/2007 | Holm | 434/247 |
| 2008/0102424 | A1 | | 5/2008 | Holljes | |
| 2010/0045463 | A1 | * | 2/2010 | Bradley et al. | 340/573.1 |
| 2011/0208444 | A1 | * | 8/2011 | Solinsky | 702/41 |

FOREIGN PATENT DOCUMENTS

WO    WO 2007/059301    5/2007

OTHER PUBLICATIONS

De Cocq, et al.; "Performance Monitoring in Equine Sports"; Proceedings of Measuring Behavior 2010; pp. 13-15.
Hobbs, et al.; "Motion analysis and its use in equine practice and research"; Wiener Tierarztliche Monatszeitschrift, vol. 97, Jan. 1, 2010; pp. 55-64.
PCT/US2013/037825; Filed Apr. 23, 2013; Raytheon Company; international search report dated Sep. 17, 2013.

* cited by examiner

*Primary Examiner* — Robert J Utama
*Assistant Examiner* — Sadaruz Zaman (57) ABSTRACT

Systems, devices, and methods for gathering data from a horse and rider and providing training to the rider are provided. In one aspect, for example, a method of training an equestrian rider can include performing a ride by an equestrian rider on a horse, and obtaining ride data from the ride, the ride data including video, inertial measurements, rider joint, head, torso, and/or limb information, horse joint, head, torso, and/or limb information, and at least one force measurement between the horse and the rider during the rider. The ride data can then be analyzed and at least one riding improvement to be made by the rider can be identified, and the at least one riding improvement to be made to the rider can be relayed to the rider to provide training for a subsequent ride.

11 Claims, 7 Drawing Sheets

EQUESTRIAN PERFORMANCE SENSING SYSTEM

BACKGROUND OF THE INVENTION

In equestrian riding, the interaction between the horse and the rider can be a factor in the success of the riding experience. In the case of competitive equestrian riding, the horse/rider interaction can be influential to competitive success. One problem that can arise in training a rider, however, relates to the temporal disparity between the ride and the training that takes place. In other words, the rider may not receive constructive training until after the ride is completed, when the rider must then make an association with the training being received and the performance that occurred in the past.

Furthermore, in some cases improper habits developed by a rider during training can be manifested in improper habits acquired by the horse. Such acquired habits by the horse can be difficult to reverse, and, depending on the severity, can significantly, and often adversely, influence the performance of the horse.

SUMMARY OF THE INVENTION

The present disclosure provides systems, devices, and methods for gathering data from a horse and rider and providing training to the rider. In one aspect, for example, a method of training an equestrian rider can include performing a ride by an equestrian rider on a horse, and obtaining ride data from the ride, the ride data including video, inertial measurements, rider joint, head, torso, and/or limb information, horse joint, head, torso, and/or limb information, and at least one force measurement between the horse and the rider during the rider. The ride data can then be analyzed and at least one riding improvement to be made by the rider can be identified, and the at least one riding improvement to be made to the rider can be relayed to the rider to provide training for a subsequent ride. In one aspect, the ride is a subsequent ride. In some aspects, the horse is a horse simulator capable of responding to the rider to simulate the riding event.

In another aspect, the method can further include performing a plurality of subsequent rides by the equestrian rider, obtaining the ride data from each of the plurality of subsequent rides, and analyzing the ride data from each of the plurality of subsequent rides and tracking over time the least one riding improvement to be made by the rider.

Various techniques of analyzing the ride data are contemplated, and any such technique is considered to be within the present scope. In one aspect, for example, analyzing the ride data further includes generating a simulated representation of the horse and the rider from at least two data sets selected from video, inertial measurements, rider joint, head, torso, and/or limb information, horse joint, head, torso, and/or limb information, and at least one force measurement between the horse and the rider. In another aspect, the method can further include generating the simulated representation of the horse and the rider from inertial measurements, rider joint, head, torso, and/or limb information, horse joint, head, torso, and/or limb information, and at least one force measurement between the horse and the rider. In some aspects, analyzing the ride data further includes comparing at least a portion of the simulated representation to at least a portion of a desired rider and horse representation.

In one aspect, obtaining ride data from the ride further includes coupling a plurality of rider position sensors to the rider in locations that provide a plurality of rider joint, head, torso, and/or limb position information, coupling a plurality of horse position sensors to the horse in locations that provide a plurality of horse joint, head, torso, and/or limb position information. coupling at least one force sensor between the horse and the rider, and coupling at least one inertial measurement unit to at least one of the horse or the rider. The method can further include capturing inertial measurements, rider joint, head, torso, and/or limb position information, horse joint, head, torso, and/or limb position information, and at least one force measurement between the horse and the rider during the ride.

In another aspect, obtaining ride data from the ride can further include positioning a plurality of video cameras spaced apart from the horse and the rider, the plurality of video cameras being time-synced, and capturing video of the horse and rider from a plurality of viewing directions during the ride. In yet another aspect, obtaining ride data from the ride can further include coupling at least one physiological sensor to at least one of the rider or the horse and capturing physiological data from the at least one physiological sensor.

Various improvements in riding are contemplated, and any such improvement that can be identified from the ride data and relayed to the rider is considered to be within the present scope. Non-limiting examples of riding improvements can include a rider body position, a degree of rein force, a degree of stirrup force, a degree of interfacial force between the rider and the horse, horse gate, horse position on a course, an amount of stress, and the like, including combinations thereof. In one aspect, relaying the at least one improvement to be made to the rider can include reviewing the ride data with the rider following the ride and relaying the at least one improvement to be made. In another aspect, relaying the at least one improvement to be made to the rider can include relaying the at least one improvement to be made to the rider during the ride.

The present disclosure additionally provides a closed loop system for training an equestrian rider. Such a system can include a plurality of rider position sensors operable for attachment to a rider in locations that provide a plurality of rider joint, head, torso, and/or limb position information, a plurality of horse position sensors operable for attachment to a horse in locations that provide a plurality of horse joint, head, torso, and/or limb position information, and a plurality of video cameras operable to be spaced apart from the horse and the rider, the plurality of video cameras operable to be time-synced and positioned to capture video of the horse and rider from a plurality of viewing directions. The closed loop system can also include at least one force sensor operable to be functionally coupled between the horse and the rider, a plurality of inertial measurement units operable to couple to at least one of the horse or the rider, a data acquisition system operable to collect and store data from the rider position sensors, the horse position sensors, the at least one force sensor, and the inertial measurement units, and a data display system operable to display the data collected from the data acquisition system. The closed loop system can also include a training system operable to train the equestrian rider based on the data collected from the data acquisition system and displayed on the data display system. In some aspects, the data acquisition system is further operable to collect and store video data from the video cameras. Additionally, in one aspect, the closed loop system can include at least one physiological sensor operable for attachment to at least one of the rider or the horse capable of detecting a level of stress. In another aspect, the closed loop system can include a rider perspective video camera operable to couple to the rider. In yet another aspect, the closed loop system can include a location tracking device operable to couple to at least one of the rider or the horse.

A variety of force sensors between the horse and the rider can be beneficial and are thus contemplated. Such sensors can vary depending on the specific system and the desired results of the training. In one aspect, for example, the at least one force sensor includes at least one rein sensor operable to measure rein force applied between the horse and the rider. In another aspect, the at least one force sensor includes at least one stirrup sensor operable to measure stirrup force applied between the horse and the rider. In yet another aspect, the at least one force sensor includes at least one saddle sensor operable to measure saddle force applied between the horse and the rider.

In another aspect, a closed loop system for training an equestrian rider can include a plurality of rider position sensors operable for attachment to a rider in locations that provide a plurality of rider joint, head, torso, and/or limb position information, a plurality of horse position sensors operable for attachment to a horse in locations that provide a plurality of horse joint, head, torso, and/or limb position information, at least one force sensor operable to be functionally coupled between the horse and the rider, and a plurality of inertial measurement units operable to couple to at least one of the horse or the rider. The system can also include a data acquisition system operable to collect data from the rider position sensors, the horse position sensors, the at least one force sensor, and the inertial measurement units. Furthermore, a training system operable to provide training to the equestrian rider by providing sensory feedback to the equestrian rider based on the data collected from the data acquisition system can be included.

In one specific aspect, providing training to the equestrian rider can further include determining a ride performance parameter from at least a portion of the data collected from the data acquisition system, comparing the ride performance parameter to a desired ride performance parameter to determine a performance discrepancy, and providing the sensory feedback to the equestrian rider to inform of the performance discrepancy. Non-limiting examples of types of sensory feedback can include acoustic stimuli, vibratory stimuli, visual stimuli, and combinations thereof.

There has thus been outlined, rather broadly, various features of the invention so that the detailed description thereof that follows may be better understood, and so that the present contribution to the art may be better appreciated. Other features of the present invention will become clearer from the following detailed description of the invention, taken with the accompanying claims, or may be learned by the practice of the invention.

BRIEF DESCRIPTION OF THE DRAWINGS

The present disclosure will become more fully apparent from the following description and appended claims, taken in conjunction with the accompanying drawings. Understanding that these drawings merely depict exemplary embodiments of the present disclosure they are, therefore, not to be considered limiting of its scope. It will be readily appreciated that the components of the present disclosure, as generally described and illustrated in the figures herein, could be arranged and designed in a wide variety of different configurations. Nonetheless, the invention will be described and explained with additional specificity and detail through the use of the accompanying drawings in which:

DETAILED DESCRIPTION OF EXEMPLARY EMBODIMENTS

The following detailed description of exemplary embodiments of the disclosure makes reference to the accompanying drawings, which form a part hereof and in which are shown, by way of illustration, exemplary embodiments in which the invention may be practiced. While these exemplary embodiments are described in sufficient detail to enable those skilled in the art to practice the invention, it should be understood that other embodiments may be realized and that various changes to the invention may be made without departing from the spirit and scope of the present invention. Thus, the following more detailed description of the embodiments of the present disclosure is not intended to limit the scope of the invention, as claimed, but is presented for purposes of illustration only and not limitation to describe the features and characteristics of the present invention, to set forth the best mode of operation of the invention, and to sufficiently enable one skilled in the art to practice the invention. Accordingly, the scope of the present disclosure is to be defined by the appended claims.

In describing and claiming the present invention, the following terminology will be used in accordance with the definitions set forth below.

The singular forms "a," "an," and, "the" include plural referents unless the context clearly dictates otherwise. Thus, for example, reference to "a sensor" includes reference to one or more of such sensors, and reference to "the camera" includes reference to one or more of such cameras.

As used herein, "substantially" refers to situations close to and including 100%. Substantially is used to indicate that, though 100% is desirable, a small deviation therefrom is acceptable. For example, substantially simultaneously includes situations that are exactly simultaneous, as well as situations wherein a negligible amount of time disparity occurs between two events.

As used herein, the term "about" is used to provide flexibility to a numerical range endpoint by providing that a given value may be "a little above" or "a little below" the endpoint.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc.

This same principle applies to ranges reciting only one numerical value. Furthermore, such an interpretation should apply regardless of the breadth of the range or the characteristics being described.

The present disclosure describes systems and methods for gathering data from a horse and rider and providing training to the rider. It should be noted that the present specification is not limited to equestrian situations. Any sport, technical performance, or activity that can benefit from such closed loop training is considered to be within the present scope. Non-limiting examples can include track events such as pole vaulting, high jump, hurdles, and the like; aquatic events such as swimming and diving; skating; golfing; gymnastics; military and SWAT operations; and the like.

As has been described, in equestrian riding the interaction between the horse and the rider can be a factor in the success of the riding experience. For competitive equestrian riding, the horse/rider interaction can be influential to competitive success. As such, it can be beneficial to gather relevant data regarding the rider and the horse during a riding event for use in training the rider, as well as training a rider using such data. Thus, a rider can perform a riding event on a horse (including a horse simulator), data can be captured of the riding event, and this data can be used to improve or otherwise train the rider for subsequent riding events. Thus this "closed loop" system allows the performance of a rider to be captured with a high level of detail, analyzed, and used to improve future riding behavior. It should be noted that the term "horse" can include both horses and horse simulators capable of behaving in a horse-like manner.

A properly trained rider can result in a properly trained horse. Conversely, an improperly trained rider can result in an improperly trained horse. It is possible for a horse to pick up undesirable habits from the rider during conventional training of the rider. These habits can be very difficult to reverse, thus potentially limiting the abilities and/or value of the horse. By utilizing the various aspects of the present disclosure, undesirable rider habits can be corrected by a trainer prior to sustained interactions between the rider and a horse.

Figure 1:
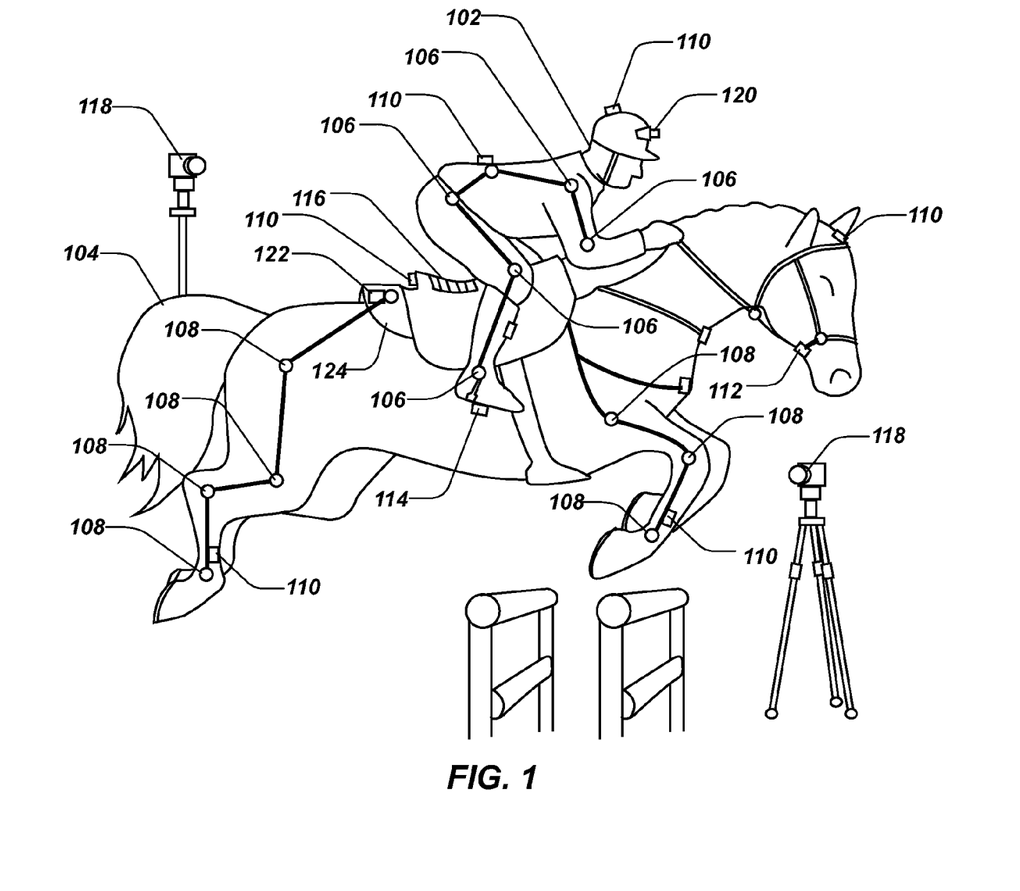
FIG. 1 illustrates a perspective view of a horse and a rider during a riding event in accordance with one exemplary embodiment of the present disclosure.

In one aspect of the present disclosure, for example, a closed loop system for training an equestrian rider is provided. One non-limiting example of such a system is shown in FIG. 1. In this case, the system is operable to be coupled to and used with a rider 102 and a horse 104. A plurality of rider position sensors 106 can be attached at various locations on the rider 102. These rider position sensors 106 can provide positional information regarding and/or relative to the rider over time as the rider is performing a riding event. Such positional information can include any relevant and/or desirable rider position information including, without limitation, rider joint, head, torso, and/or limb positions (or positions of any part of these). Indeed, the rider position sensors 106 can be coupled to the rider 102 at any useful position, including at rider joints, between joints, various points along the torso, the head, hands, feet, and the like. As such, the position of the rider's body can be accurately tracked in space over the course of the ride or riding event, providing quantitative information about the rider's movements and positioning relative to the horse. It should be noted that joint angles and/or limb positions are, in one aspect, derived by using an array of inertial measurement units attached to the rider. Appropriate algorithms and software code can thus be used to derive joint angles and limb positions from the output of the inertial measurement units. This derivation of joint angles and limb positions can be performed at the location of the rider or remote from the rider. As such, in some aspects, joint angles and limb positions may not be measured directly.

Various sensors can be attached to the rider in a variety of ways. For example, in one aspect the sensors can be attached to the rider's regular riding clothing. In another aspect, the rider can wear a dedicated suit, or the rider can don wearable elements (e.g., arm bands/wraps, leg bands/wraps, etc.), having sensors integrated therein, or otherwise associated with these. Thus any type of sensor or motion capture device, including a motion capture suit, is considered to be within the present scope.

Furthermore, in some aspects, a plurality of horse position sensors 108 can be attached at various locations on the horse 104. The horse position sensors 108 can provide positional information regarding the position of the horse, and the position of the horse relative to the rider over time. Such positional information can include any relevant and/or desirable horse position information including, without limitation, horse joint, head, torso, and/or limb positions (or positions of any part of these). As with the rider position sensors 106, the horse position sensors 108 can be coupled to the horse 104 at any useful position, including at horse joints, between joints, various points along the torso, the head, legs, hooves, and the like. As such, the position of the horse's body can be accurately tracked in space over the course of the ride or riding event, providing quantitative information about the horse's movements and positioning relative to the rider. Thus, capturing the horse's motion can help determine how the rider moves and interacts with the horse through the stirrups & saddle. The horse sensors can also allow the precise determination and timing of significant events, such as the horse jumping. Additionally, the horse sensors can provide an approximation of the horse's movements to better interpret and visualize the interaction between the horse and rider.

Various types of positional sensors are contemplated, and it should be noted that any sensor that can provide positional information over time is considered to be within the present scope. In one aspect, for example, the positional sensors can be based on the visualization of the sensors using optical detection equipment. As such, the sensors can be reflective or otherwise visualized by the optical detection equipment in order to determine position of the rider and/or the horse relative to the optical detection equipment. In another aspect, the positional sensors themselves can detect motion and/or position. In one specific aspect, for example, the positional sensors can be gyro-based sensors capable of capturing motion and transmitting such information wirelessly to a motion capture system. Non-limiting examples of such sensors are distributed by Animazoo, such as, for example, the Animazoo IGS-109-M, or by XSens, such as the MVN motion capture suite. These and similar non-visual-based sensors are not hindered by optical occlusions, and can be worn underneath clothing, saddles, straps, integrated into a specialized suit, and the like.

In another aspect, the closed loop system can further include one or more inertial measurement units (IMU) 110 that couple to the rider 102, the horse 104, or both the rider and the horse for measuring angular velocity, orientation and accelerations during a riding event. FIG. 1 shows various potential locations for IMU positioning, and such locations are meant to be merely exemplary and should not be seen as limiting. The IMU device can comprise a wireless sensor type that can measure orientation and acceleration information along three axes from which information about the horse and/or rider movement can be derived. Such information can include, without limitation, body orientation, acceleration, deceleration, take-off, cadence, and the like. Various IMU devices are contemplated, and any device that can collect and wirelessly transmit such positional and acceleration information is considered to be within the present scope. As can be seen by the exemplary positioning of the IMUs 110 in FIG. 1, these devices can be located on the rider's torso, the rider's helmet, the horse's head cap, the saddle, the horse's leg protection pads, boots, stirrups, and the like.

It can also be beneficial to monitor forces applied between the horse and the rider during a riding event. As such, in some aspects at least one force sensor can be functionally coupled between the horse and the rider. For example, in one aspect the system can include at least one rein sensor 112 coupled between the horse and the rider to measure the amount of rein force applied by the rider to the reins. In another aspect, the system can include at least one stirrup sensor 114 coupled between the horse and the rider to measure the amount of stirrup force applied by the rider to the stirrups. Such a stirrup sensor 114 can be located in the stirrups, in the boots of the rider, or any other location where the stirrup force can be measured. In one specific aspect, forces applied to the reigns and stirrups can be measured using load cells (commercially available) mounted in-line with the reigns and stirrups. The signal can be conditioned and then transmitted wirelessly to the data acquisition system by a wireless strain gage signal-conditioning node. This node can be attached to the saddle blanket, for example, and connected to each load cell with shielded wiring.

In some aspects, other sensors can be utilized to measure the pressure exerted between the horse and the rider. For example, a two dimensional pressure mapping system can be used to sense the pressure that a rider exerts on the horse by sitting on the saddle as well as the pressure applied to the horse with the rider's legs. In one aspect, conformal contact pressure sensing pads can be used to detect such a pressure at the saddle, inside of the legs (e.g., for measuring the force exerted by the rider's legs laterally against the horse, i.e., the squeezing force applied by the rider's legs to the horse), the sides of the boots, the soles of the boots, and the like. In one specific aspect, the system can include at least one saddle sensor 116 associated with the saddle and positioned to measure the saddle force applied between the horse and the rider.

Non-limiting examples of conformal force sensing pads can include TactArray by PPS Inc., or Tekscan contact sensor pads. In general, force sensors allow the measurement of the degree of force being exerted on the horse by the rider at various contact regions.

In yet another aspect, the closed loop system can include a plurality of video cameras 118 spaced apart from the horse 104 and the rider 102. Thus, the video cameras can capture the riding event from different directions to reconstruct the riding event. In one aspect, the video cameras can be time-synced to facilitate simultaneous playback and/or analysis. The video cameras can also be time-synced to data acquisition from the rider and the horse. The video cameras can be any type of video camera capable of capturing the riding event. In some aspects, digital cameras are useful, particularly in those situations where further video processing is desirable. Depending on the level of detail desired, high definition cameras can also be utilized. In one aspect, the video cameras can be high speed video cameras (e.g. 60 fps). The cameras can also be equipped with motorized pan, tilt, and zoom (PTZ) features. These PTZ features can be operated manually or automatically. In automatic mode, the cameras can automatically track the horse and rider and zoom in-and-out (within their operating range) to maintain a user specified field-of-view. In some aspects, the cameras can use a GPS sensor, an Ultra Wide Band RF TAG sensor, an optical tracking system or device, or other position tracking device, to position and automatically track the horse and rider. This automatic mode reduces the need for a camera operator during the ride. Furthermore, the video cameras can be permanently fixed in place, or in some cases can be moveable. In other aspects, the camera can be fixed to a retractable mount to thus retract into the ground when not in use.

In addition to the video cameras 118 spaced apart from the horse and rider, in some aspects one or more video cameras can be associated with the rider and/or the horse during the riding event. As is shown in FIG. 1, for example, a rider perspective video camera 120 can be coupled to the rider 102 to provide a "rider's view" of the riding event. In one aspect, the rider perspective video camera can include an eye tracking feature to monitor the eye movements of the rider.

As has been described, data collected using the various sensors and video cameras can be synchronized and stored in a way that facilitates display and playback of information using either preset or user-defined scripts. For instance, video collected using stationary video cameras and a helmet-mounted camera could be displayed at the same time as information about the force applied by the rider to the reins is shown.

It can additionally be beneficial to monitor a physiological occurrence or condition (e.g., one to detect the stress level) of the rider and/or the horse. The ability to quantify physiological conditions indicating such things as relaxation/stress can be very useful in training situations. As such, in some aspects at least one physiological sensor can be functionally coupled to the rider to detect a level of stress. In other aspects, at least one physiological sensor can be functionally coupled to the horse to detect a level of stress. Or, obviously, at least one physiological sensor can be functionally coupled to both the rider and the horse. Any type of physiological sensor capable of detecting a physiological condition and associated signal, particularly those relating to stress levels, is considered to be within the present scope. Non-limiting examples of physiological conditions can include heart rate, blood pressure, temperature, respiration, EKG, EMG, EEG, and the like, including combinations thereof. A physiological monitor can also be utilized to detect injury or sickness in the horse.

In some aspects, it can be beneficial for the closed loop system to include a location tracking system or device to capture specific locations of the horse and/or the rider over time. Non-limiting examples of such location tracking systems or devices can include GPS tracking devices or systems, RF tag tracking devices or systems, optical tracking devices or systems, ultrasonic tracking devices or systems, acoustic tracking devices or systems, object recognition tracking devices or systems, and the like, or combinations of these. Such location tracking devices or systems can allow tracking of the position of the horse and/or the rider over time during the riding event. Data representing the position of the horse and/or the rider during the riding event can be utilized for further data processing, particularly in those aspects whereby a simulation of the riding event is generated. It is noted that not all types of tracking systems are recited herein, and that those mentioned should not be construed as limiting in any way. Indeed, it is contemplated that a variety of different types of tracking systems or devices can be utilized that are not specifically described herein, and that such will be recognized by those skilled in the art.

In one aspect, therefore, the location tracking device or system can comprise a GPS sensor (e.g., an ordinary GPS or differential GPS sensor) to accurately track the horse and/or rider position over time. Such GPS sensors can be located anywhere that is feasible on the rider and/or the horse (such as GPS sensor 122 shown in FIG. 1). Possible locations can include, without limitation, the saddle, the stirrups, the helmet of the rider, the rider's clothing, and the like.

In some exemplary embodiments, the horse and/or rider can wear or otherwise don or have coupled thereto, one or more emitters for facilitating, assisting in, supplementing, enhancing, or complementing the location tracking function. In other words, the location tracking systems or devices can include one or more emitters or emitter types. For example, an emitter can be used to facilitate the tracking of the position of the horse and/or the rider during the riding event. In another example, an emitter can be used to transmit information. Non-limiting examples of such emitters can include light emitters, sound emitters, ultrasonic energy emitters, acoustic energy emitters, RF emitters, optical emitters, IR emitters (or some other part of the EM spectrum), or the like, and combinations of these. The one or more emitters can be located at various locations about the horse and/or rider. The emitted signals can be detected by a suitable or appropriate type of detector, and the information contained therein utilized for further data processing and training purposes.

In one exemplary embodiment, an optical emitter can be used to emit IR signals received by an IR camera detector. Other types of optical emitters can include laser or other type of light emissions. The laser or light can be detected by a detector, or in another aspect, the light emitted by the horse and/or the rider can be tracked as objects moving in a visual field where other objects are stationary.

In still another exemplary embodiment, acoustic emitters and detectors can be used. For example, a microphone can be used to detect sounds emitted by or from the horse and/or the rider. The detected acoustic energy could be produced passively as a result of horse and/or rider movement (e.g., sounds produced by horse footfall, such as when the horse gallops), or the acoustic energy could be manufactured (e.g., by a powered acoustic emitter). It is noted that the acoustic energy emitted and detected can be in the audible range, or in the inaudible range, such as with ultrasonic energy.

In still another exemplary embodiment, object recognition can be used for tracking purposes. Descriptions and associated models of various items or objects to be detected can be built and stored (e.g., models of the shape of the horse, the shape of the rider, the shape of a helmet, etc.). A camera could then be used in conjunction with object recognition software that post processes the images to detect the presence of the objects or items, and then track these.

In addition to the various data gathering devices, the present closed loop system can further include a data acquisition system for data gathering. Such a data acquisition system can be operable to collect, coordinate, and store data from the various data gathering devices, including, without limitation, the rider position sensors, the horse position sensors, the force sensors, the inertial measurement units, and the like. Thus, data that is generated by the various data gathering devices associated with the horse and/or the rider can be transmitted to the data acquisition system during the riding event, so that such data can be further processed, reviewed, and/or presented to the rider in a form that can provide a training opportunity. In some aspects, the data acquisition system can additionally collect and store video data from the one or more video cameras, which may also be considered a type of data gathering device. Various data acquisition systems are contemplated, and any such system capable of acquiring and storing ride event data is considered to be within the present scope. In one aspect, for example, the data acquisition system can be coupled to the horse, the rider, or the horse and the rider. FIG. 1 shows one example of a data acquisition system 124 that is coupled to the horse and associated with or within the saddle.

Figure 2:
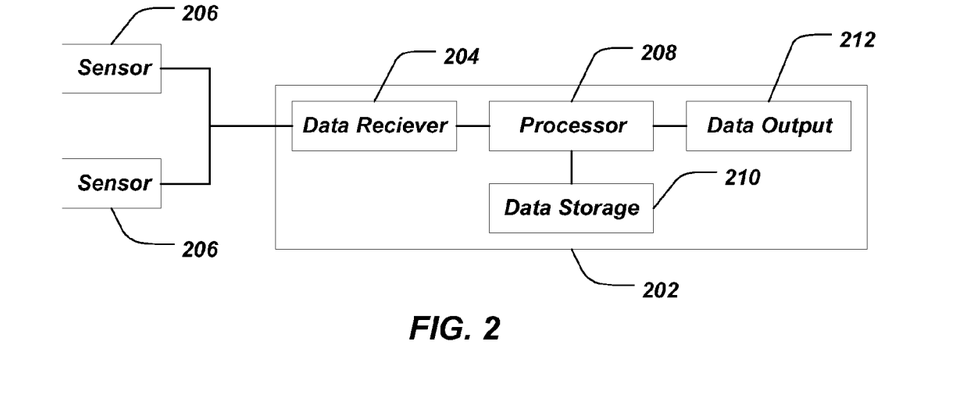
FIG. 2 illustrates a schematic of a data acquisition system in accordance with another exemplary embodiment of the present disclosure.

A variety of configurations and components of a data acquisition system are contemplated, and any system allowing such data acquisition is considered to be within the present scope. As is shown in FIG. 2, for example, a data acquisition system 202 (e.g. 122 of FIG. 1) can include a data receiver 204 that is operable to receive data from the various data gathering devices 206 (e.g., sensors 106, 108, 110, 112, 114, 116, cameras 118, 120, of FIG. 1 or any combination thereof) associated with the horse and the rider. Data can be gathered by data receiver 204 from the various data gathering devices in various ways. For example, data can be gathered through wired connections between the data gathering devices 206 and the data receiver 204. In another example, data can be gathered through wireless connections between the data gathering devices 206 and the data receiver 204. Wireless connections can include any type of wireless communication mode or protocol known, such as, for example, networking connections, RF, Bluetooth, infrared, and the like, including combinations thereof. In other examples, data can be gathered from the various data gathering devices via both wired and wireless connections. A processor 208 can process the incoming data and facilitate storage of the data in a data storage device 210. Data can be retrieved by the processor 208 from the data storage device 210 and output from the data acquisition system 202 via a data output device 212. The output of the data from the data output device 212 can be by any known technique, including, without limitation, wireless transmission, wired transmission, data media such as flash media, data disks, and the like. In some examples, the data acquisition system 202, or portions thereof, can be implemented using a general purpose computer.

In another aspect, the data acquisition system 202 can be utilized at a location that is remote from the horse and rider. In this case, data generated by the data gathering devices can be wirelessly transmitted to the data acquisition system, or wirelessly transmitted to a receiver in communication with and/or part of the data acquisition system. By locating the data acquisition system remote from the horse and rider, a greater storage capacity, higher processing power, and in some cases greater functionality can be achieved.

As one non-limiting example, when the data acquisition system is initiated a data control program is launched that will look for all expected sensors in the deployment. Any missing sensors will generate a warning and give the operator the opportunity to fix the sensor(s) and enter the sensor detection or simply continue without the missing sensors. The data control program will use location tracking data data to pan/tilt and zoom the camera in an attempt to keep the horse in the center of the frame. The main User Interface (UI) of the data collection program can show scaled down views from the video cameras as they track. The operator will be able to adjust the horizontal and vertical pan and the zoom on each camera to keep the horse in the middle of the frame.

When the rider is ready to begin a run the operator will press the Record button, and the system will start collecting data. At this point, a singular event (e.g. video clapper) will be acquired on both the rider perspective camera and the video cameras. This singular event can be used to synchronize video feeds, and can be accomplished in a post-processing step. The user will able to cancel the operation at any time, throwing away any data already collected and waiting to start recording again. When the run is over, the operator can press the stop button at which point the data control program will then ask the operator to name the data, and ask if post-processing of the data should be done now or deferred until later.

The closed loop system can further include a data display system to display the data collected from the data acquisition system. Numerous such display systems are contemplated, and can vary widely depending on the desired level of detail and various ways in which the data is to be displayed. The data can be displayed during the ride to a trainer or other interested individual, or the data can be displayed following the ride. Thus, the display system can be utilized by a trainer during and/or following the ride to assist in training the rider for subsequent rides. In many cases, detailed analysis and debriefing can be utilized to train the rider following the ride.

Figure 3:
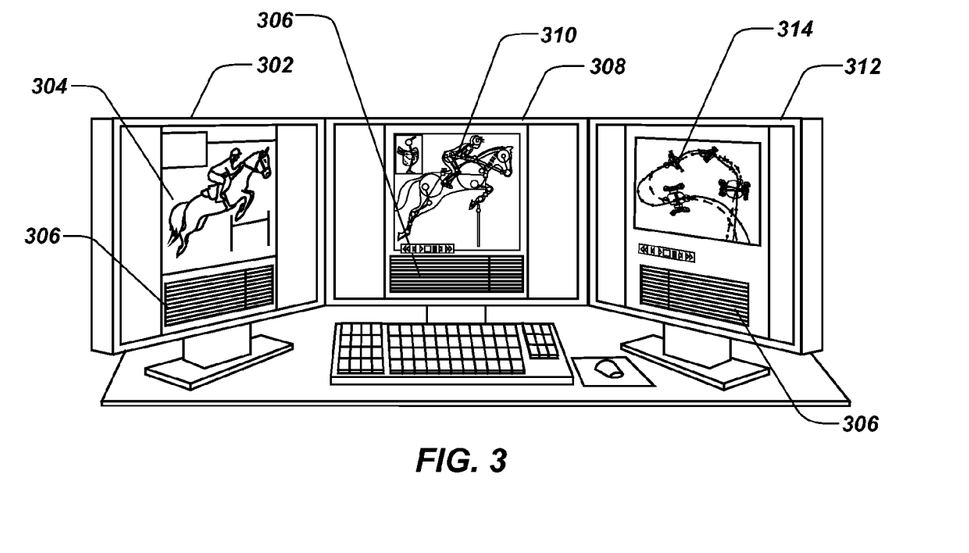
FIG. 3 illustrates a data display system in accordance with another exemplary embodiment of the present disclosure.

Various types of data displays and simulated representations of the horse and the rider are contemplated, and any such simulated representation that can benefit the rider for a training purpose is considered to be within the present scope. In one specific aspect, as is shown in FIG. 3, data derived from the data acquisition system can be displayed in an individual playback station having a split-screen format for separate viewing of different data types. As one non-limiting example, a first screen 302 can be used to display video data 304 and user selected data 306 such as force on the reins, force on the saddle over time, etc. A second screen 308 can be utilized to display a simulated representation 310 derived from the data captured from the horse and rider. This screen can also display user selected data 306. A third screen 312 is shown displaying a course layout superimposed with the path 314 followed by the horse and additional user data 306. Data analyzed at the data display system can be utilized to train the rider and improve subsequent rides.

Figure 4:
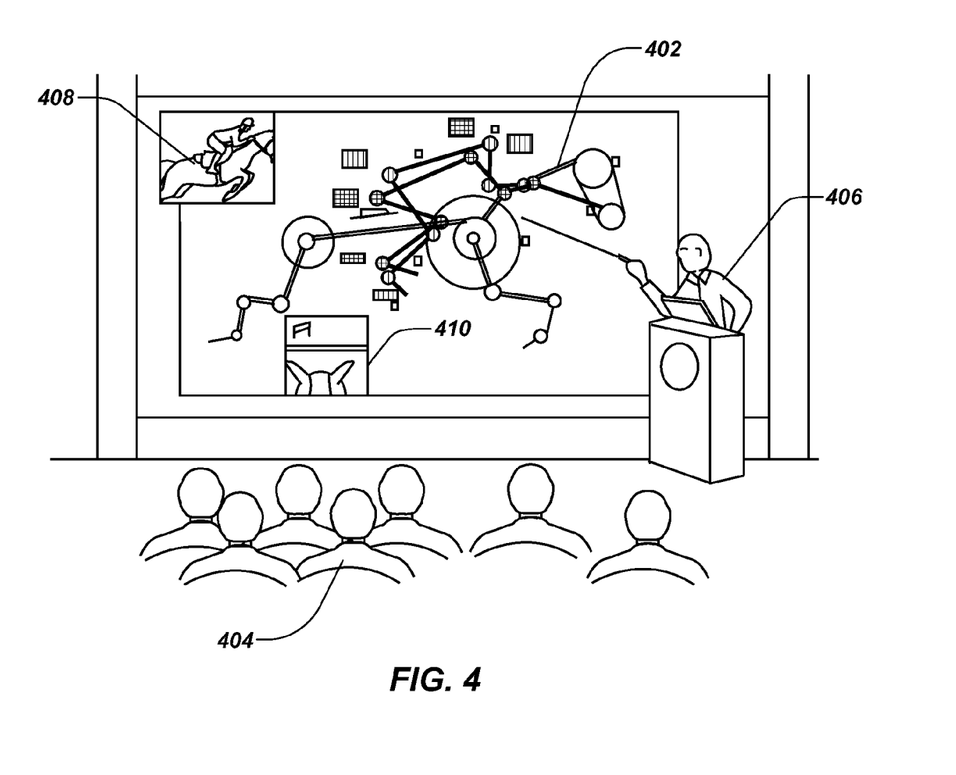
FIG. 4 illustrates a data display system in accordance with another exemplary embodiment of the present disclosure.

In another example, a group display room can be utilized. One example of such a simulated representation is shown in FIG. 4, where a virtual representation 402 can be utilized to train a rider or riders, inform interested parties 404 such as researchers, investors, and the like. In some cases the simulated representation 402 can be utilized to evaluate the performance of a particular rider, thus identifying possible strengths and weaknesses prior to, during, or following training This input to the rider can be valuable for improving subsequent rides. In some cases, a training expert or lecturer 406 can be utilized to provide an expert or advanced opinion or training Additionally, in some aspects, multiple screens showing different data types can be utilized in the group display room.

As has been described, the simulated representation can contain a variable amount of detail depending on the desired level of training. As is shown in FIG. 4, for example, the simulated representation 402 is shown as comprising a stick figure representation of the horse and rider. Such a representation can be beneficial, particularly for reviewing the angular and positional relationships between the horse and the rider at various points of the riding event, in addition to points of stress and force applied by the rider to the horse. Additionally, in some aspects a desired horse and rider representation can be superimposed over the rider's actual performance to allow the rider to better visualize by comparison mistakes that were made or optimal positioning that was achieved. If the process is repeated, the rider can see a graphical representation of improvement over time, or in some cases, degeneration of riding skills or the acquisition of undesirable habits. A desired horse and rider representation can be generated in many cases by a trained professional to assist in training the rider. Such a trained professional can understand the desired riding characteristics of a desired riding performance, and can generate these desired riding characteristics on the simulation.

FIG. 4 additionally shows the use of captured video 408 from at least one of the video cameras located apart from the horse and rider. Such captured video 408 can be time synced to the simulated representation 402 to allow a simultaneous video viewing of the riding event. Additionally, captured rider video 410 from a video camera coupled to the rider and/or the horse can be time synced and displayed along with the simulated representation 402 to allow further training from the rider's perspective.

The simulated representation can be generated by any computational system capable of combining and analyzing the data captured from the various data gathering devices. The simulated representation can be utilized as still images or as a motion rendering of the riding event. Data from the various sensors (e.g. positional, motion, force, GPS, etc.) can thus be used to provide a detailed relationship between the positions and motions of the horse relative to the rider. This data can then be used to generate the simulated representation of the riding event. The riders positioning relative to the horse, the body posture of the rider, the forces applied between the rider and the horse, and any additional beneficial data information can be used to generate the simulation. Such a simulation can then be replayed to the rider to provide training advice, by pointing out errors in the rider's performance and/or reinforcing correct riding behavior. By utilizing such a simulation to train the rider, the rider has the opportunity to view the riding event from a perspective that allows training discussions to occur at a more technical level that has previously been possible. Additionally, such simulation training can help correct undesirable riding habits before they begin to negatively affect a horse.

Figure 5:
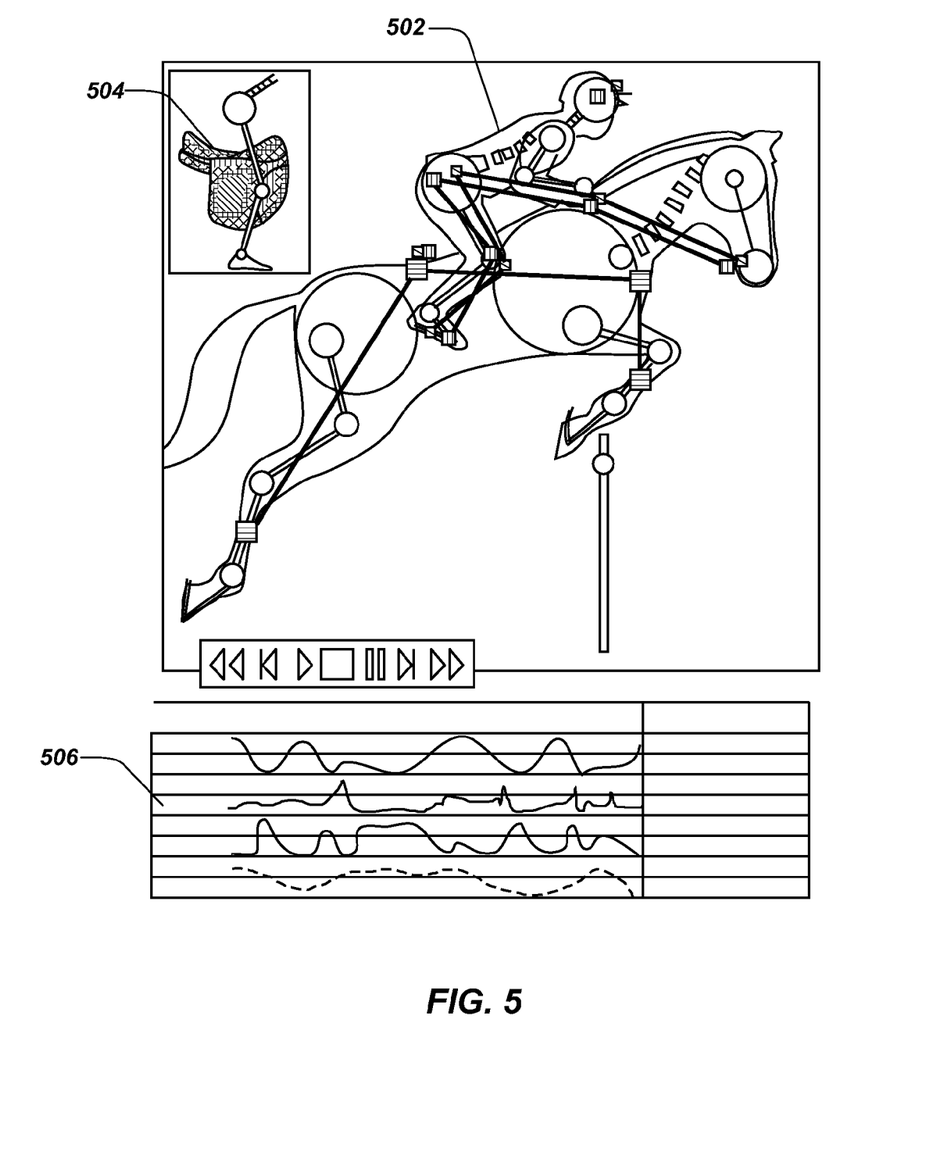
FIG. 5 illustrates a simulated representation of a horse and a rider during a riding event in accordance with another exemplary embodiment of the present disclosure.

One non-limiting example of a simulated representation of a horse and rider is shown in FIG. 5. Motion capture software can process data from the rider's and the horse's data gathering sensors in real-time, and can show how the rider is currently moving. This software will simultaneously convert this motion data into standard motion capture data formatted file and saved for later playback. A 3D viewer program can be used to display and playback motion capture data. Simplified 3D avatars of the rider and horse 502 can be displayed in this viewer and their positions and movements can be controlled by the motion capture data. While recording a session, the viewer can show the resulting motions from the motion capture subsystems as it is being recorded. During playback, recorded data files can be used. The 3D viewer can have viewing controls that allow rotating the view around the horse and rider to see the motions from different points of view. It can also have a zoom in and out feature to closely examine some features in the display. FIG. 5 also shows a contour map 504 collected from the saddle, boots sides, and sole contact pressure sensors displayed in a separate window. Total force and center-of-pressure may be selected as alternate views. A user selected data window 506 is also shown. Such a window is capable of displaying a variety of data. For example, force on the reins, stirrups, and saddle over time can be displayed.

Figure 6:
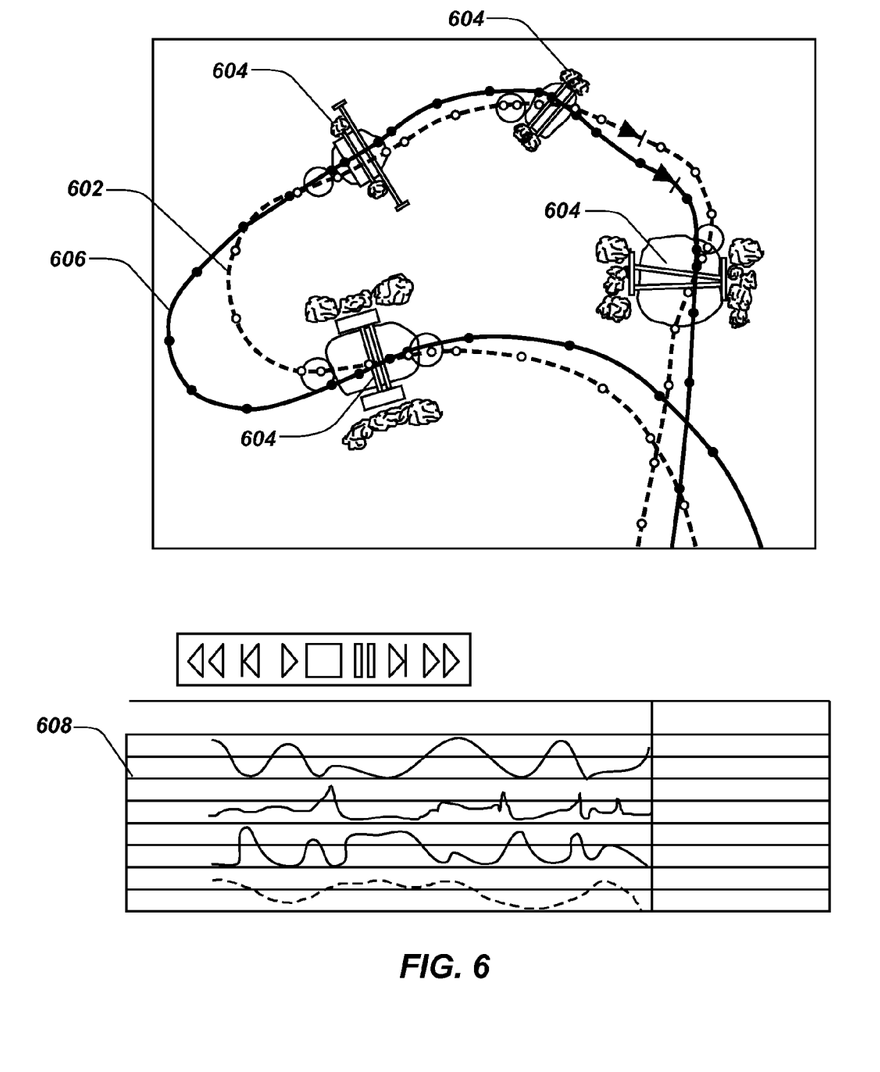
FIG. 6 illustrates simulated representation of acquired data in accordance with another exemplary embodiment of the present disclosure.

In another aspect, a course layout and horse trajectory can be displayed, as is shown in FIG. 6. This path 602 followed by the horse and rider can be obtained through a variety of mechanisms, including, for example, a high resolution location tracking system used to track the horse position on the course. In one aspect, GPS coordinates showing accurate location of the various obstacles 604 on the course can be recorded using a hand-held GPS device and stored for later use and playback. A simple UI can allow the user to select obstacles from a database of obstacle avatars and let them be placed at the corresponding GPS locations. The path 602 followed by the horse and rider can be displayed on a top view 2-D map of the course. The software can allow the user to superimpose paths followed during separate runs 606. Other useful data, such as take-off point (determined from accelerometer data), horse speed, etc. can be displayed in a user selected data window 608.

Additionally, if physiological data has been captured from the horse and/or the rider, a level of stress can be time synced and displayed with the simulated representation in order to monitor such stress at various points of the riding event. This can allow a trainer to focus on particular segments of the ride that are worrisome or in some way difficult or stressful to the rider and/or the horse with the intent of alleviating at least some of the stress that may potentially be experienced in those segments through enhanced training The simulated representation can additionally be provided in any form of informational transmission. For example, in one aspect, the simulated representation can be delivered by a large format video device such as a large screen monitor, a projection system, or the like. In other aspects, the simulated representation can be viewed on a smaller computer screen or small format video device. In other aspects, the simulated representation can be presented to the rider for training purposes in printed images or papers (e.g., a screen capture or generated display at a particular point in time) that allow markups and/or annotations relating to the riding event and the performance of the rider and/or the horse.

The closed loop system can also include a training system that is capable of training the rider based on the data collected from the data acquisition system and displayed on the data display system. Thus, the provided training can assist the rider in improving riding techniques and performance in subsequent rides. As the process is continued over time, the rider's performance will increase and the training increases. Additionally, given the types of data being acquired, a record of the rider's performance for a given ride parameter can be monitored over time to show the presence or lack of improvement. In one aspect, the training system can be an equestrian professional or other individual with the capacity to view the acquired data and provided training to the rider. In another aspect, the training system can be an automated system that responds to the acquired data and provides training to the rider based on the acquired data.

As has been described, in some aspects the horse can be a horse simulator. As such, the present disclosure can additionally include systems and methods for training a rider using a horse simulator. As has also been described, it is possible for a horse to pick up undesirable habits from the rider during conventional training of the rider. These habits can be very difficult to reverse, thus potentially limiting the abilities and/or value of the horse. By using a horse simulator to train a rider, undesirable rider habits can be corrected by a trainer prior to sustained interactions between the rider and a horse. Additionally, a rider can utilize a simulator for longer durations than is possible with a real horse due to tiring of the animal.

Figure 7:
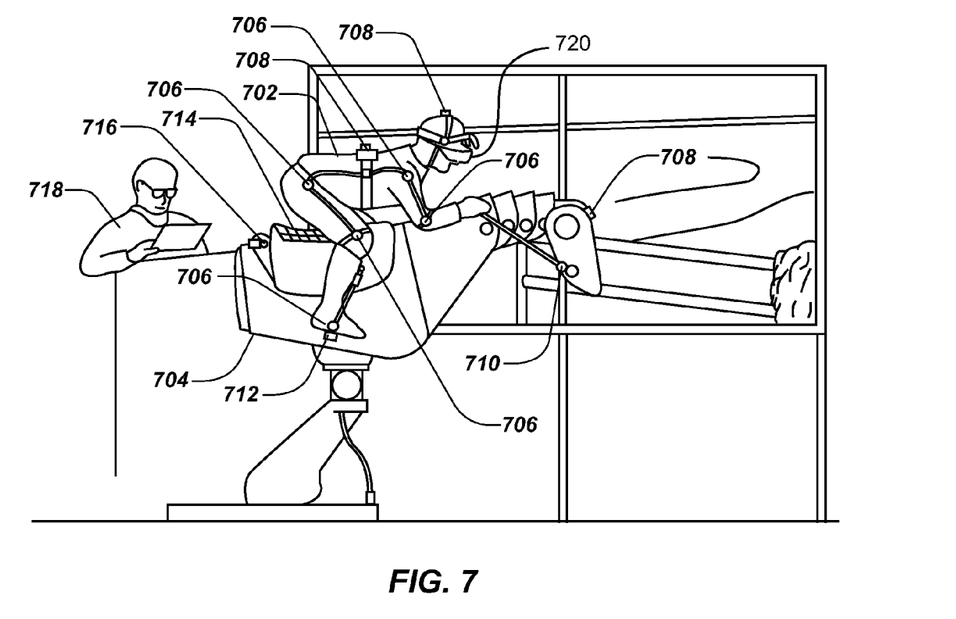
FIG. 7 illustrates a rider on a horse simulator in accordance with another exemplary embodiment of the present disclosure.

As can be seen in FIG. 7, a rider 702 is shown mounted on a horse simulator 704. The horse simulator 704 has the capability of performing motions that are similar with respect to the rider as to what is experienced during a riding event. In other words, the simulator behaves as a horse would behave, and responds to commands given by the rider as a horse would respond. Any type of horse simulator capable of behaving as a horse and simulating jumping, acceleration, and deceleration motions is considered to be within the present scope. In one example, such a simulator can include a high performance motion platform that is mounted by the rider and is closed-loop controlled by a commands generator in order to emulate the behavior of a generic horse when running through the virtual course. The motion platform itself can consist of a 6-DOF high performance motion platform onto which the simulated horse's body, neck, and head can be mounted. The platform can be controlled to emulate, with sufficient fidelity, the movements and behavior of the generic horse. The simulated horse's body can be equipped with an actuated neck and head, since it is in the rider's field of view and will need to move as a real horse's head does to enhance the rider's illusion of riding a real horse, i.e., to more effectively immerse the rider into the synthetic environment.

An input commands subsystem can also be utilized that will allow the rider to control the generic simulated horse in close to the same manner that they would ride an actual horse. In some aspects, the simulator can be programmed to behave as a generic horse, while in other aspects, the simulator can be programmed to behave as a specific horse with specific behaviors. As such, the rider can ride the simulator through a given course and experience a natural riding event, as the simulator will respond to the commands of the rider throughout the course.

In some cases, the data acquired from a previous riding event on a real horse can be used to replay or recreate (i.e., simulate) the riding event on the horse simulator for the rider to re-experience, such as for the purpose of recognizing or identifying, and further correcting, mistakes that may have been made during the riding event. Thus, the captured data, as has been described herein, can be input into the horse simulator to provide such an experience. In other aspects, an "ideal" or otherwise desired riding event can be input to and generated by the horse simulator for comparison purposes, and/or to provide or illustrate an optimal riding performance.

The same or similar data gathering devices can be utilized with the horse simulator as were described for the data capturing systems and methods further described herein. For example, returning to FIG. 7, a plurality of rider position sensors 706 can be attached at various locations on the rider 702. These rider position sensors 706 can provide positional information regarding and/or relative to the rider over time as the rider is performing a riding event on the simulator. Such positional information can include any relevant and/or desirable rider position information including, without limitation, rider joint, head, torso, and/or limb positions (or positions of any part of these). The rider position sensors 706 can be coupled to the rider 702 at any useful position, including at rider joints, between joints, various points along the torso, the head, hands, feet, and the like. In another example, various IMU units 708 can be coupled to the rider 702 and/or the horse simulator 704. Forces applied between the rider 702 and the horse simulator 704 can also be monitored using various force sensors that are functionally coupled therebetween. One non-limiting example can include at least one rein sensor 710 coupled between the horse simulator and the rider to measure the amount of rein force applied by the rider to the reins. Another non-limiting example can include at least one stirrup sensor 712 coupled between the horse simulator and the rider to measure the amount of stirrup force applied by the rider to the stirrups. Yet another non-limiting example can include at least one saddle sensor 714 associated with the saddle and positioned to measure the saddle force applied between the horse simulator and the rider. The system can further include a data acquisition system 716 operable to capture data generated by the rider and the horse simulator to assist in the training procedure. The data acquisition system can be coupled directly to the horse simulator, or it can be located remote from the horse simulator. The captured data allows a trainer 718 to monitor the simulated ride and provide training feedback to the rider.

Figure 8:
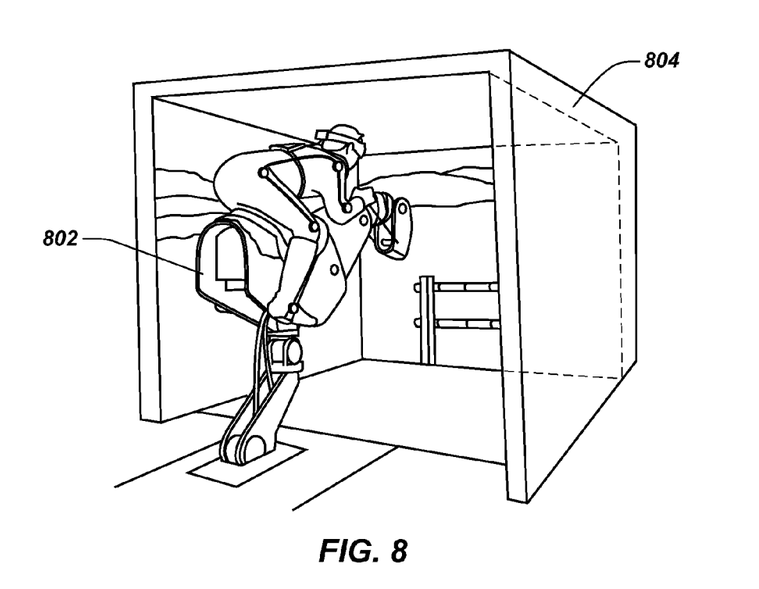
FIG. 8 illustrates a rider on a horse simulator in a virtual reality immersion cave in accordance with another exemplary embodiment of the present disclosure.

In order to enhance the simulation experience, video of the simulated ride through the course can be played for the rider. Any form of video display is contemplated, and any such display is considered to be within the present scope. In one aspect, as is shown in FIG. 8 for example, the horse simulator 802 can be used in conjunction with a virtual reality immersion cave 804. Multiple interior walls of the cave can be lined with video panels to create the experience of an actual ride. In some aspects, all interior walls, including the floor can be lined with video panels. The video experience in the cave can be displayed in 2D or in 3D. In another aspect, a Head Mounted Display (HMD) 720 (see FIG. 7) can be worn by the rider to enhance the riding experience. Such a display can be presented to the rider in 2D or in 3D. In some cases, the HMD can be utilized with an accurate simulated horse and rider body motion capture system as an alternative to an immersion cave. Additionally, in some aspects, an HMD can be worn by a trainer or other interested person to observe the ride, either from the rider's perspective or from a bystander's prospective from any location on the virtual course.

Depending on the technology used to display images of the virtual course, the rider and the simulated horse can appear in the field of view as graphical representations, such as, for example, the rider's hands, arms, and the horse's neck, head, body, and the like. More specifically, in an immersion cave a physical simulated horse will be in the field of view of the rider. However, in one aspect, when using a HMD the rider may see a representation of the rider, of the horse, and of the course in the field of view. Regarding training of the rider for both the real horse and the simulator, in one aspect, feedback and such training can be provided to the rider during the riding event (e.g., in real-time). For example, when the rider deviates from a desired ride performance, a deviation indicator can alert the rider to perform a correction. Non-limiting examples of such an indicator can include audible, visual, tactile, or other sensory stimuli. As one example, a buzzer could sound as a rider exerts too much force on the reins. As another example, a light can illuminate if the rider's body position is either correctly aligned or incorrectly aligned. Vibratory sensations can also be generated in response to other non-desirable aspects of the rider's performance.

Figure 9:
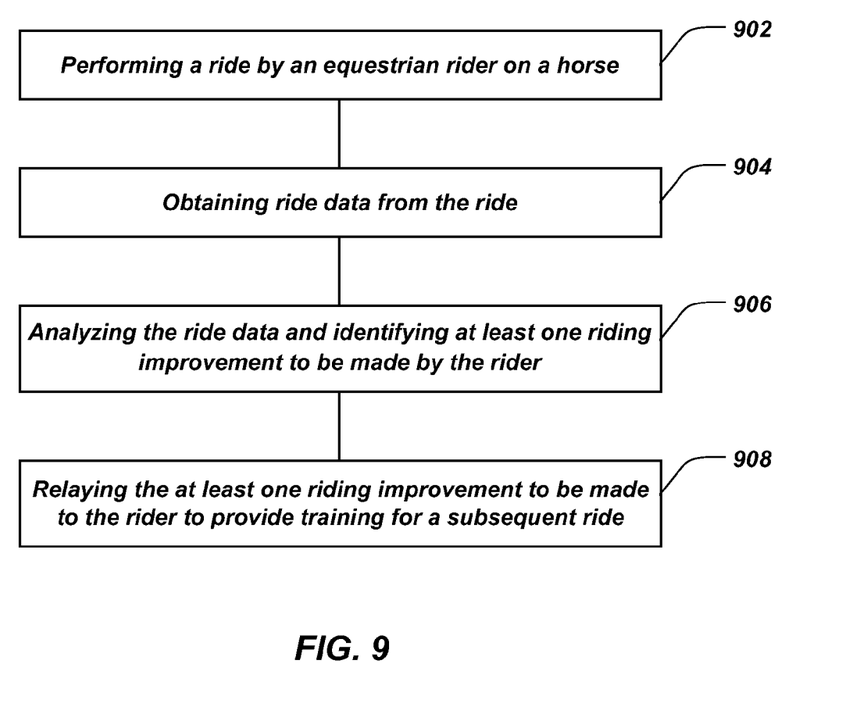
FIG. 9 illustrates a method of training an equestrian rider in accordance with another exemplary embodiment of the present disclosure.

The present disclosure additionally provides methods of training an equestrian rider. One such method, as is shown in FIG. 9, includes performing a ride by an equestrian rider on a horse 902 and obtaining ride data from the ride 904, the ride data including video, inertial measurements, rider joint, head, torso, and/or limb information, horse joint, head, torso, and/or limb information, and at least one force measurement between the horse and the rider during the rider. The method also includes analyzing the ride data and identifying at least one riding improvement to be made by the rider 906 and relaying the at least one riding improvement to be made to the rider to provide training for a subsequent ride 908. In some aspects, the ride is a subsequent ride. In other words, it is intended that the method be repeated to further provide training to the rider and improve the rider's abilities. As such, the method can also include performing a plurality of subsequent rides by the equestrian rider. In each of these subsequent rides, ride data is obtained and analyzed so that the riding improvement can be tracked over time. Non-limiting examples of riding improvements can include rider body position, a degree of rein force, a degree of stirrup force, a degree of interfacial force between the rider and the horse, horse gate, horse position on a course, an amount of stress, and the like, including combinations thereof. The improvement to be made can be relayed to the rider during the ride or following the ride.

Figure 10:
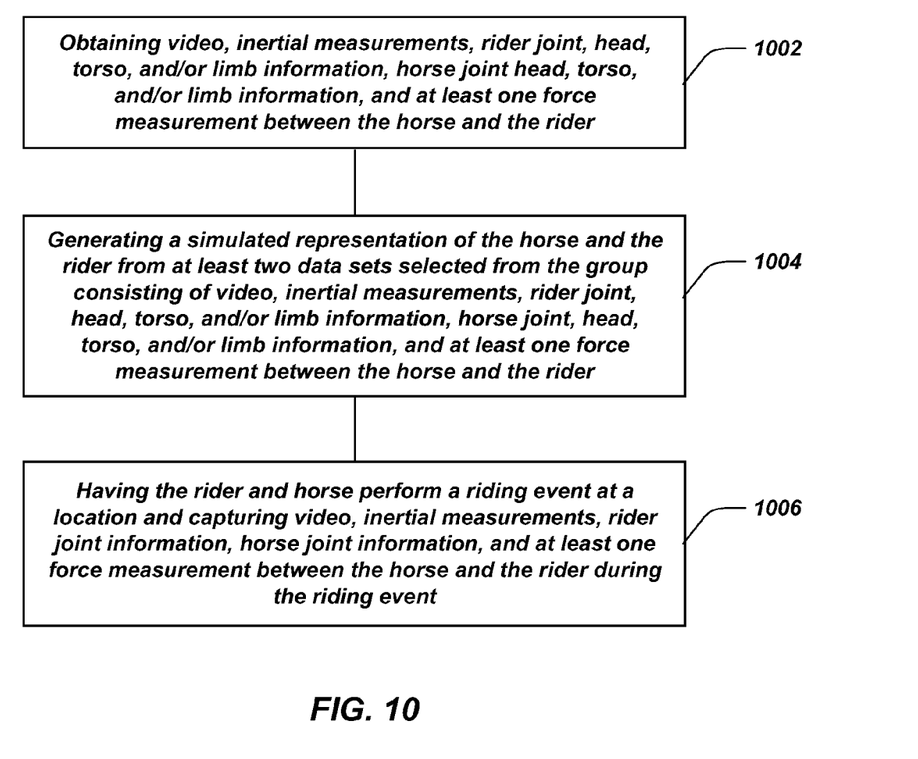
FIG. 10 illustrates a method of training an equestrian rider in accordance with another exemplary embodiment of the present disclosure.

In another aspect, a method of training an equestrian rider can include, as is shown in FIG. 10, obtaining 1002 video, inertial measurements, rider joint, head, torso, and/or limb information, horse joint head, torso, and/or limb information, and at least one force measurement between the horse and the rider, and generating 1004 a simulated representation of the horse and the rider from at least two data sets selected from video, inertial measurements, rider joint, head, torso, and/or limb information, horse joint, head, torso, and/or limb information, and at least one force measurement between the horse and the rider. A data set can be defined as any collection of data received from a data gathering device or a type of data gathering device. One example of a data set can be the inertial measurements acquired by the data gathering devices during the riding event.

Another example of a data set can be the joint positions of the rider acquired by the data gathering devices during the riding event. In another aspect, the method can include generating the simulated representation of the horse and the rider from inertial measurements, rider joint, head, torso, and/or limb information, horse joint, head, torso, and/or limb information, and at least one force measurement between the horse and the rider. In general, it can be beneficial to capture and utilize a sufficient amount and type of data to allow a desired level of training to the rider. The method can additionally include providing 1006 training to the rider based on the simulated representation. The training provided to the rider can occur in real time during a ride, or it can occur following the ride. The real-time training can include, for example, any combination of sensory feedback as described elsewhere herein.

The foregoing detailed description describes the invention with reference to specific exemplary embodiments. However, it will be appreciated that various modifications and changes can be made without departing from the scope of the present invention as set forth in the appended claims. The detailed description and accompanying drawings are to be regarded as merely illustrative, rather than as restrictive, and all such modifications or changes, if any, are intended to fall within the scope of the present invention as described and set forth herein.

More specifically, while illustrative exemplary embodiments of the invention have been described herein, the present invention is not limited to these embodiments, but includes any and all embodiments having modifications, omissions, combinations (e.g., of aspects across various embodiments), adaptations and/or alterations as would be appreciated by those in the art based on the foregoing detailed description. The limitations in the claims are to be interpreted broadly based on the language employed in the claims and not limited to examples described in the foregoing detailed description or during the prosecution of the application, which examples are to be construed as non-exclusive. For example, in the present disclosure, the term "preferably" is non-exclusive where it is intended to mean "preferably, but not limited to." Any steps recited in any method or process claims may be executed in any order and are not limited to the order presented in the claims. Means-plus-function or step-plus-function limitations will only be employed where for a specific claim limitation all of the following conditions are present in that limitation: a) "means for" or "step for" is expressly recited; and b) a corresponding function is expressly recited. The structure, material or acts that support the means-plus function are expressly recited in the description herein. Accordingly, the scope of the invention should be determined solely by the appended claims and their legal equivalents, rather than by the descriptions and examples given above.

What is claimed and desired to be secured by Letters Patent is:

1. A closed loop system for training an equestrian rider, comprising:
    a plurality of rider position sensors operable for attachment to a rider in locations that provide a plurality of rider joint, head, torso, and limb position information;
    a plurality of horse position sensors operable for attachment to a horse in locations that provide a plurality of horse joint, head, torso, and limb position information;
    a plurality of video cameras operable to be spaced apart from the horse and the rider, the plurality of video cameras operable to be time-synced and positioned to capture video of the horse and rider from a plurality of viewing directions;
    at least one force sensor operable to be functionally coupled between the horse and the rider;
    a plurality of inertial measurement units operable to couple to at least one of the horse or the rider;
    a data acquisition system operable to collect and store data from the rider position sensors, the horse position sensors, the at least one force sensor, and the inertial measurement units;
    a data display system operable to display the data collected from the data acquisition system; and
    a training system operable to train the equestrian rider based on the data collected from the data acquisition system and displayed on the data display system.

2. The system of claim 1, wherein the data acquisition system is further operable to collect and store video data from the video cameras.

3. The system of claim 1, further comprising at least one physiological sensor operable for attachment to at least one of the rider or the horse capable of detecting a level of stress.

4. The system of claim 1, further comprising a rider perspective video camera operable to couple to the rider.

5. The system of claim 1, further comprising a location tracking system operable to couple to at least one of the rider or the horse.

6. The system of claim 5, wherein the location tracking system comprises, at least in part, an emitter and a detector for detecting one or more signals emitted by the emitter, wherein the emitter is operable to couple to at least one of the rider or the horse.

7. The system of claim 5, wherein the location tracking system can include a member selected from the group consisting of a GPS tracking system, an RFtag tracking system, an optical tracking system, an ultrasonic tracking system, an acoustic tracking system, an object recognition tracking system, or a combination thereof.

8. The system of claim 1, wherein the at least one force sensor includes a force sensor selected from the group consisting of a rein sensor operable to measure rein force applied between the horse and the rider, a stirrup sensor operable to measure stirrup force applied between the horse and the rider, a saddle sensor operable to measure saddle force applied between the horse and the rider, one or more rider's leg sensors operable to measure a force exerted by the rider's legs against the horse, or a combination thereof.

9. A closed loop system for training an equestrian rider, comprising:
    a plurality of rider position sensors operable for attachment to a rider in locations that provide a plurality of rider joint, head, torso, and limb position information;
    a plurality of horse position sensors operable for attachment to a horse in locations that provide a plurality of horse joint, head, torso, and limb position information;
    at least one force sensor operable to be functionally coupled between the horse and the rider;
    a plurality of inertial measurement units operable to couple to at least one of the horse or the rider;
    a data acquisition system operable to collect data from the rider position sensors, the horse position sensors, the at least one force sensor, and the inertial measurement units; and
    a training system operable to provide training to the equestrian rider by providing sensory feedback to the equestrian rider based on the data collected from the data acquisition system.

10. The system of claim 9, wherein providing training to the equestrian rider further includes:
    determining a ride performance parameter from at least a portion of the data collected from the data acquisition system;
    comparing the ride performance parameter to a desired ride performance parameter to determine a performance discrepancy; and
    providing the sensory feedback to the equestrian rider to inform of the performance discrepancy.

11. The system of claim 9, wherein the sensory feedback includes a sensory modality selected from the group consisting of acoustic stimuli, vibratory stimuli, visual stimuli, and combinations thereof.

* * * * *